United States Patent
Nagaraj et al.

(10) Patent No.: US 7,797,357 B1
(45) Date of Patent: *Sep. 14, 2010

(54) FILE SYSTEM AND METHODS FOR PERFORMING FILE CREATE AND OPEN OPERATIONS WITH EFFICIENT STORAGE ALLOCATION

(75) Inventors: Murali Nagaraj, Pune (IN); Ravideep Singhvi, Pune (IN); Shriram Wankhade, Pune (IN); Aalop S. Shah, Pune (IN); Milind Borate, Pune (IN); Samir Desai, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 11/714,298

(22) Filed: Feb. 28, 2007

Related U.S. Application Data (63) Continuation of application No. 10/735,088, filed on Dec. 12, 2003, now Pat. No. 7,188,128.

(51) Int. Cl.
  *G06F 7/00* (2006.01)
  *G06F 17/00* (2006.01)
  *G06F 17/30* (2006.01)
(52) U.S. Cl. .................. 707/812; 707/802; 707/899
(58) Field of Classification Search ............... 707/1, 707/10, 205, 206; 709/203, 223, 219; 711/114, 711/170
See application file for complete search history.

(56) References Cited

U.S. PATENT DOCUMENTS

| | | | |
|---|---|---|---|
| 5,218,695 A | 6/1993 | Noveck et al. | |
| 5,930,828 A * | 7/1999 | Jensen et al. | 707/205 |
| 6,185,601 B1 * | 2/2001 | Wolff | 709/203 |
| 6,643,672 B1 * | 11/2003 | Lebel | 707/206 |
| 6,687,764 B2 | 2/2004 | Sonoda et al. | |
| 7,188,128 B1 * | 3/2007 | Nagaraj et al. | 707/205 |
| 7,302,520 B2 * | 11/2007 | Kazar et al. | 711/114 |

(Continued)

OTHER PUBLICATIONS

"A Storage Space Management Policy for a Cluster File System" published by Xiong et al., Jan. 2002.*

(Continued)

*Primary Examiner*—Apu M Mofiz
*Assistant Examiner*—Susan Y Chen
(74) *Attorney, Agent, or Firm*—Meyertons, Hood, Kivlin, Kowert & Goetzel, P.C.; B. Noel Kivlin (57) ABSTRACT

A client computer system of a cluster may send a request to create a file in a cluster file system. A server may create a file in response to the information and allocate space in a storage to the file. If a request to write to the file is received within a predetermined amount of time, the write may complete without requiring that additional operations be performed to allocate space to the file. If a write to the file is not received within the predetermined amount of time, the space allocated to the file when it was created may be de-allocated. The file system may additionally or alternatively perform a method for opening a file while delaying an associated truncation of space allocated to the file. If a request to write to the file is received within a predetermined amount of time, the write may be performed in the space already allocated to the file.

25 Claims, 7 Drawing Sheets

U.S. PATENT DOCUMENTS

| | | | |
|---|---|---|---|
| 7,487,228 B1 * | 2/2009 | Preslan et al. | 709/219 |
| 2002/0069324 A1 * | 6/2002 | Gerasimov et al. | 711/114 |

OTHER PUBLICATIONS

"Compaq COBOL User Manual," Compaq COBOL, accessed Oct. 23, 2003 (http://www.Helsinki.fi/atk/unix/dec_manuals/cobv27ua/cobrm_003.htm).

"IBM General Parallel File System for AIX: Administration and Programming Reference," IBM, accessed Oct. 23, 2003.

Fegreus, Jack, "Journaling on RAID," accessed Oct. 23, 2003 (http://www.open-mag.com/features/Vol_18/filesystems/filesystems.htm) 5 pages.

"New HOWTo: Linux Partition HOWTO," Section 7: Formatting Partitions, Apr. 5, 2001, http://www.linuxplanet.com/linuxplanet/tutorials/3174/8/.

"Ext2 Patches for Linux 2.1," Mar. 12, 1998.

"Lustre: A Scalable, High-Performance File System," Cluster File Systems, Inc., Lustre Whitepaper Version 1.0, Nov. 11, 2002, 13 pages.

Kroonmaa, Andres, "Re: Squid Performance Wish-List," Aug. 27, 1998.

Haskin, Roger L.,"Tiger Shark-a Scalable File System for Multimedia," IBM, 1998, 14 pages.

Bovet, Daniel P. and Marco Cesati, "Understanding the Linux Kernel," Second Edition, O'Reilly & Associates, Inc., 2003, pp. 574-576, 597-599.

"Sun™ Cluster 3.0 Software Cluster File System (CFS): Making the Most of the Global File Service," Technical White Paper, Sun Microsystems, Inc., 2001, 27 pages.

* cited by examiner

FILE SYSTEM AND METHODS FOR PERFORMING FILE CREATE AND OPEN OPERATIONS WITH EFFICIENT STORAGE ALLOCATION

This application is a continuation of U.S. patent application Ser. No. 10/735,088, entitled "FILE SYSTEM AND METHODS FOR PERFORMING FILE CREATE AND OPEN OPERATIONS WITH EFFICIENT STORAGE ALLOCATION," filed on Dec. 12, 2003 now U.S. Pat. No. 7,188,128, which is hereby incorporated by reference in its entirety.

BACKGROUND OF THE INVENTION

1. Field of the Invention

This invention relates generally to storing and modifying data file systems.

2. Description of the Related Art

Various computer systems are often coupled to one or more networks in a given environment. These computer systems may need to share data storage or computing power beyond each computer system's individual capacity. Thus, with the growing needs for additional computing power and storage by sharing the resources of each computer system, cluster technology is an increasing focus of research and development. One of these important resources is shared data storage.

A cluster may be constructed from a plurality of computer systems coupled to a network. The computer systems that are included in the cluster are referred to as nodes, and the network that couples the nodes is often termed a cluster interconnect. However, merely coupling a plurality of computers to a network does not constitute a cluster. Each node of the cluster must run clustering software to unify each node's otherwise independent operation. By the unification of otherwise independent operation, it is possible to increase computing power and increase amounts of data storage available.

Typically with computer systems, the storage and retrieval of data often involves using a file system associated with the operating system. A file system may include a collection of management structures which impose a logical and/or systematized structure upon a storage medium.

A cluster file system is a form of file system that may allow a plurality of nodes of a cluster to simultaneously access the same storage medium, such as a storage area network (SAN). Typically, one or more server nodes access the storage medium directly. Server nodes using a cluster file system may provide access to the storage medium as a shared data storage to client nodes. Each client node using the cluster file system may view the shared data storage as a local resource.

A cluster file system is dynamic in function and may include data structures in the shared data storage as well as in other memory mediums associated with the servers and clients. A data structure including user data may be considered a file (or regular file). The file may store the user data in a space of the shared data storage. Other data structures may organize internal data, referred to as metadata, of the cluster file system. Metadata may include information about files, file identity, allocated space, and/or de-allocated space of the cluster file system.

Often nodes include a local cache of the metadata or a local status of the metadata. Typically, one of the server nodes handles metadata updates, and is responsible for coordinating accesses by the various nodes such that integrity and accuracy of the metadata (including local caches of the metadata) and/or local statuses of the metadata are maintained. Since the nodes only share the shared data storage and not a local memory medium, a significant amount of communication between the nodes may take place to correctly synchronize updates to the user data, metadata, and/or local statuses of the metadata in the cluster file system. Such updates may be required when various cluster file system operations including creating files, allocating space to files, de-allocating space from files, and/or deleting files are performed.

For example, a software program may issue a request to create a file in the cluster file system. The creation of a file in the cluster file system may require communication and/or synchronization of metadata and/or metadata updates between the nodes. After the file is created, the software program may subsequently issue a command to store user data in the file. The cluster file system may respond by allocating a space in the shared data storage to the file. However, such space allocation by the cluster file system may require additional communication and/or synchronization of metadata and/or metadata updates between the nodes. After space has been allocated to the file, the software program may store the desired user data in the file. The multiple communication and synchronization operations of the cluster file system between nodes as described in this example may add undesirable latency and limit performance.

Likewise, a software program may overwrite a file by first truncating it while opening the file. Common examples are file editors that write a file after changes and compilers that write object files when generated. Thus, when the cluster file system opens the file, the space associated with the file is de-allocated. Similar to the foregoing, this de-allocation of space may require communication and/or synchronization between the various nodes. Following this, when the software program stores data in the file, the cluster file system allocates new space to the file, thus requiring additional communication and/or synchronization between the nodes. Undesirable latency may thus be introduced, and performance may be adversely affected.

SUMMARY OF THE INVENTION

One embodiment of a cluster file system may perform a method for pre-allocating space in a storage for a file in response to a request message including information to create a file. A client computer system of a cluster may send the request message to a server of the cluster. The cluster file system functionality within the server may create a file in response to the information and allocate space in a storage to the file. The server may send a response message to the client which may include information indicating the creation of the file and/or space allocated to the file. The creation of the file and the allocation of space may occur within an atomic transaction that is coordinated and/or synchronized with various nodes of the cluster. In one particular embodiment, if a request to write to the file is received within a predetermined amount of time, the write may complete without requiring that additional operations be performed to allocate space to the file. If a request to write to the file is not received within the predetermined amount of time, the space allocated to the file when it was created may be de-allocated.

In another embodiment, a file system may perform a method for opening (or truncating) a file with space allocated to the file and delaying an associated storage de-allocation operation. If a request to write to the file is received within a predetermined amount of time, the write may be performed in the space already allocated to the file. On the other hand, if a request to write to the file is not received prior to expiration of the predetermined amount of time, the space allocated to the file may be de-allocated.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
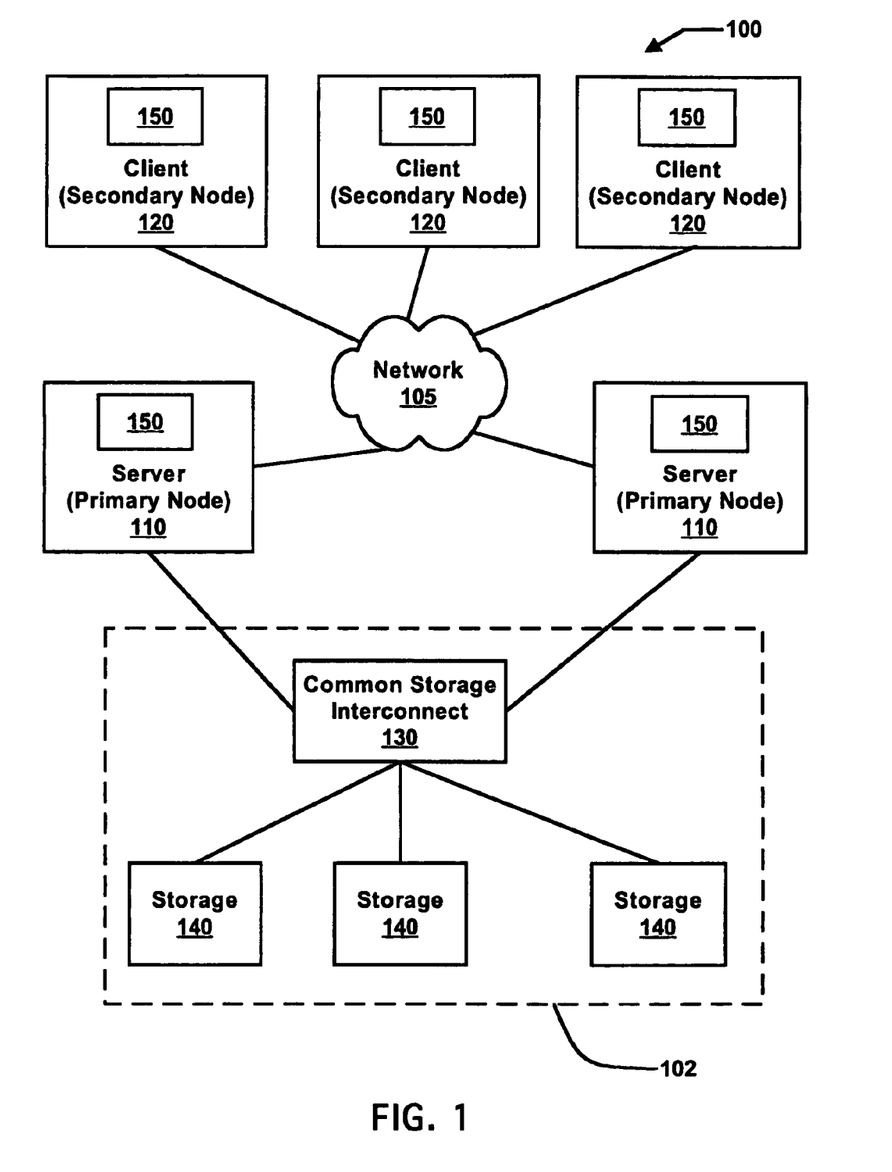
FIG. 1 is a block diagram of one embodiment of a cluster.

FIG. 1

FIG. 1 shows one embodiment of a cluster 100. In various embodiments, the cluster may be configured to support failover capabilities such that, for example, a first server 110 in cluster 100 may fail-over its workload to a second server 110, thereby providing nearly continuous service to clients 120. Cluster 100 may additionally be configured to accommodate application growth. For example, if demands become too great for the existing servers 110, additional servers may be introduced to cluster 100 and the workload may be repartitioned. Cluster 100 may further be configured to mitigate network failures. For example, clients 120 may continue to access storage programs on alternate network paths in the event certain network paths fail.

As shown, the cluster 100 of FIG. 1 includes a set of interconnected computer systems (sometimes called nodes). More particularly, one or more servers 110 are shown coupled to a storage 102, such as a storage area network (SAN). One or more clients 120 may access storage 102 through servers 110.

Each server 110 and each client 120 may be coupled to a network 105. The network 105 may include a wired network, a wireless network or a combination of wired and wireless networks. For example, the network 105 may be a standard "wired" Ethernet network which connects one or more of clients 120 to one or more of servers 110. The network 105 may also include a wireless network based on IEEE 802.11, IEEE 802.15, IEEE 802.16, etc. The network 105 may be, or be coupled to, any of various local area networks (LANs) or wide area networks (WANs), including the Internet.

Each server 110 may be coupled to a common storage interconnect (CSI) 130, such as a fibre channel hub or an Ethernet network switch. One or more storage devices 140 may be coupled to CSI 130 by SCSI (small computer system interface), IEEE 1394, universal serial bus (USB), Ethernet, fibre channel and/or any combinations of these, among others. Some embodiments of storage devices 140 may include a non-volatile memory such as a magnetic media, e.g., a hard drive, a floppy drive, or optical storage, and/or a permanent memory, e.g., a CD-ROM. Storage devices 140 may include other types of memory as well, and/or combinations thereof, such as a redundant array of independent drives (RAD) and/or a JBOD (just a bunch of drives) configuration.

For cluster computing, software technology may also be necessary. In one embodiment, cluster 100 may utilize a shared data model where storage devices 140 can be accessed by more than one server 110 at the same time. The servers 110 may synchronize access to data so they may avoid interfering with each other's operations. According to one embodiment, this shared data model is embodied by various components and functions of a cluster file system (CFS) 150 which is illustratively shown distributed across the nodes of cluster 100.

In general, cluster file system 150 provides shared file access from multiple nodes of a cluster. Cluster file system 150 may support various well known file system functions, as desired. For example, in one embodiment, cluster file system 150 may incorporate features of the Veritas SANPoint Foundation Suite™.

Figure 2:
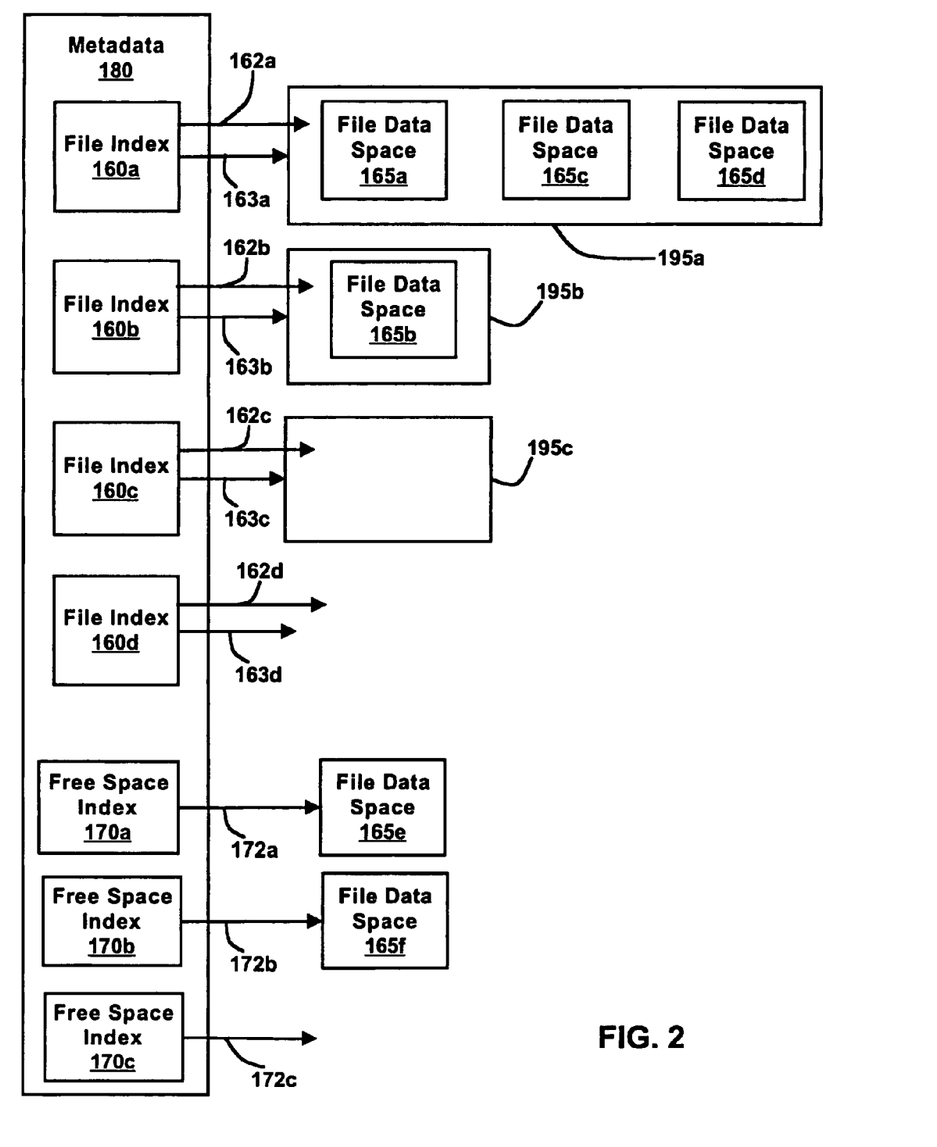
FIG. 2 is an exemplary block diagram of file data spaces and metadata associated with one embodiment of a cluster file system.
Figure 3:
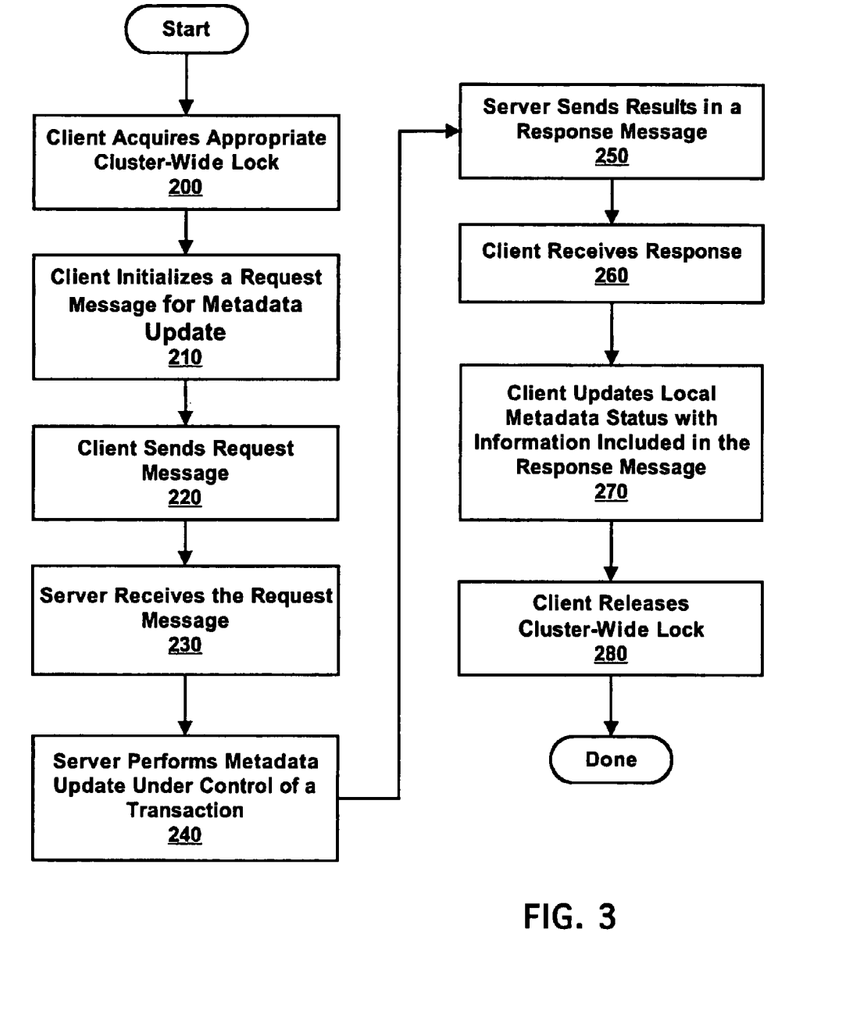
FIG. 3 is a flowchart diagram of a method for updating metadata in a cluster file system according to one embodiment.

FIGS. 2-3—Metadata and Metadata Updates

FIG. 2 is an exemplary block diagram of files, allocated file data spaces, de-allocated file data spaces, and metadata associated with one embodiment of CFS 150. CFS 150 may store user data in one or more of file data spaces. For example, FIG. 2 illustrates files, such as files 195a and 195b, which collectively include data spaces 165a-165d. FIG. 2 also illustrates a file 195c for which a possible associated data space is not currently allocated.

Metadata 180 may include various indexes or data structures such as file indexes 160a-160d and free space indexes 170a-170c. In the depiction, file indexes 160a-160c are associated with files 195a-195c, respectively. Free space indexes 170a-b may be associated with available space that is not currently allocated, such as file data spaces 165e and 165f. Generally, metadata 180 is considered internal data of CFS 150.

In one embodiment, each file index may include a file pointer. The file pointer may identify a file associated with the file index. For example, file pointers 163a-c identify files 195a-c, respectively. Additionally, a file index may include a file data pointer. The file data pointer may associate a file with one or more file data spaces. For example, a file data pointer 162a may associate file index 160a with file data spaces 165a, 165c, and 165d. Similarly, a file data pointer 162b may associate file data space 165b. Moreover, a free space pointer may associate a free space index with a file data space. For example, free space pointer 172a associates free space index 170a with file data space 165e, and free space pointer 172b associates free space index 170b with file data space 165f.

Various file system operations may require updates to metadata 180. For example, a software program may issue a command to create a file in CFS 150. CFS 150 may respond with a cluster file system operation to create a file which may include creating a file and associating the file with an available file index such as, for example, file index 160d. File index 160d may be associated with the file by updating file pointer 163*d* such that it identifies the newly created file. Thus, metadata 180 is updated when a file is created.

Similarly, when the software program issues a command to store user data in the file, a file data space may need to be allocated to the file before the user data may be stored. Accordingly, CFS 150 may respond with a cluster file system operation to allocate space to the file which may include, for example, disassociating the file data space 165*e* from free space index 170*a* and associating file data space 165*e* with file index 160*d*. This may include updating free space pointer 172*a* and file data pointer 162*d*.

The software program may likewise issue a command to de-allocate space of file 195*b*. CFS 150 may respond, for example, by disassociating file data space 165*b* from file index 160*b* and associating file data space 165*b* with free space index 170*c*. This may include updating file data pointer 162*b* and free space pointer 172*c*.

Still further, the software program may issue a command to delete a file, such as file 195*b*. CFS 150 may respond by de-allocating space of file 195*b*, as described above, and disassociating file 195*b* from file index 160*b*. This may include updating file pointer 163*b*.

In one embodiment, one of the server nodes 110 handles updates to metadata 180 of CFS 150. However, the other nodes of cluster 100 may include a local cache or local status of metadata 180. Accordingly, when changes or updates to metadata 180 are required, the CFS 150 functionality within the server node 110 may coordinate and/or synchronize these operations between the nodes to ensure coherency and to ensure that access conflicts do not occur.

FIG. 3 is a flowchart diagram of a method for updating metadata in a cluster file system. When a file system operation requiring a metadata update is initiated by a client 120, the CFS 150 functionality of the client may acquire an appropriate cluster-wide lock, as shown in block 200. Next in block 210, the client 120 may initialize a request message associated with the metadata update. The request message may include information to perform a creation of a file, a deletion of a file, an allocation of a space to a file, a de-allocation space of a file, or any combination of these cluster file system operations.

Following in block 220, the client 120 may send the request message to a server 110. The request message may be sent through network 105. The server 110 may receive the request message in block 230. Next the server 110 may perform the metadata updates within a transaction, as shown in block 240.

According to one embodiment, the transaction performed in block 240 may include a set of interrelated operations that may cause changes to the metadata of CFS 150 in a way that is atomic, consistent, and isolated. Furthermore, in some embodiments, the transaction may be synchronized between the various nodes of cluster 100.

In one embodiment, the transaction may be implemented using a transaction manager that keeps track of transactions as they execute. Before the beginning of the sequence of operations within a transaction, a call of "transaction start" may be issued to the transaction manager. Similarly, after the sequence of operations has completed, a call of "transaction commit" may be issued to the transaction manager. The atomicity of the transaction may be controlled by the call of transaction commit. If there is a failure within the system before the call of transaction commit, the transaction may not affect the state of the system. If the transaction cannot be completed for other reasons, a call of "transaction abort" may be issued to the transaction manager. The transaction abort call may nullify or mitigate any effects of the transaction.

When the transaction is completed, the server 110 may send the results of the transaction in a response message to the client 120, as shown in block 250. The response message may be sent through network 105. The client 120 may receive the response message in block 260. Next in block 270, the CFS 150 functionality within the client 120 may update its local metadata status with information included in the response message. Finally, the client 120 may release the cluster-wide lock, as shown in block 280.

Figure 4:
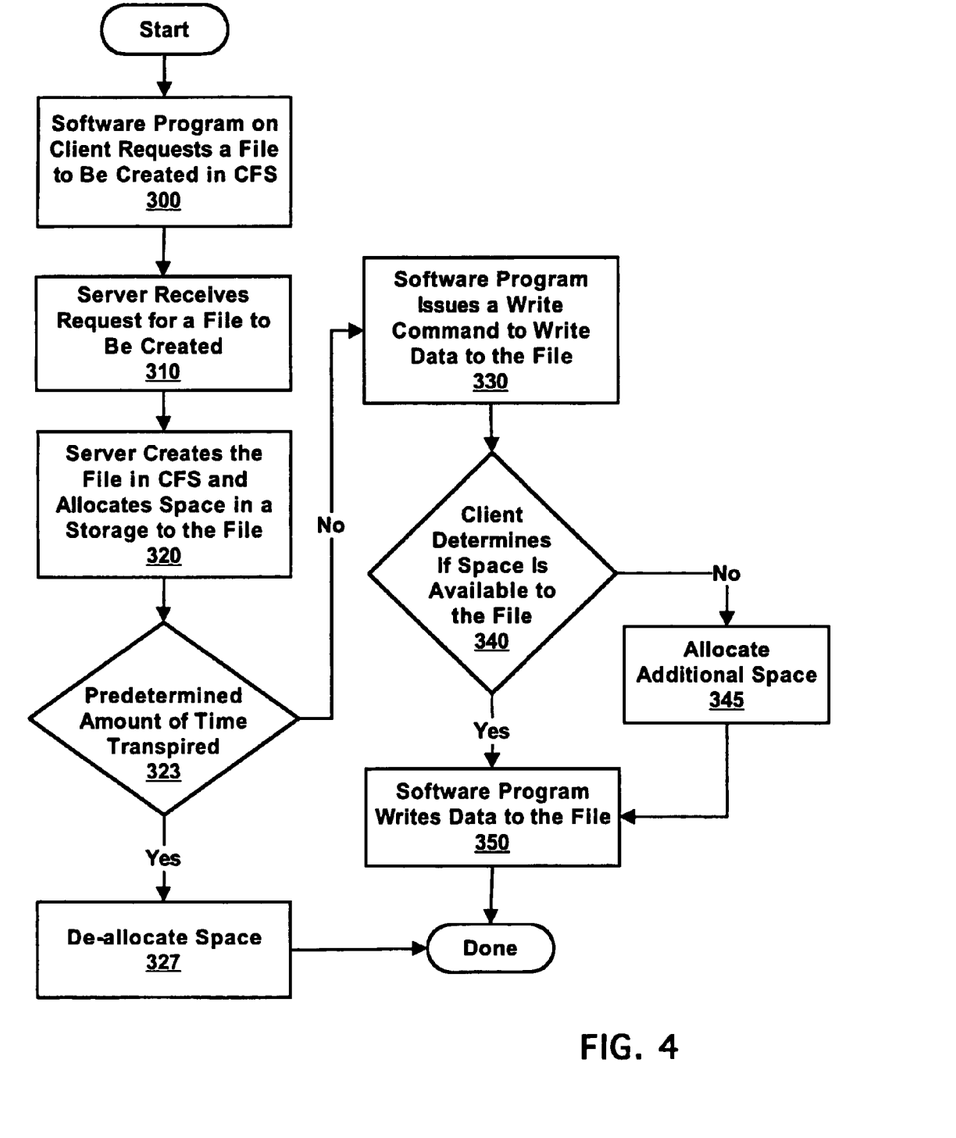
FIG. 4 is a flowchart diagram illustrating a software program on a client creating and writing data to a file in a cluster file system with a server pre-allocating space to the file according to one embodiment.

FIG. 4—Creating a File and Allocating Space to the File

FIG. 4 is a flowchart diagram illustrating a method for creating a file and pre-allocating space in a storage to the file. A software program executing on a client 120 may issue a request that a file to be created in CFS 150, as shown in block 300. As discussed above, a cluster file system operation such as creating a file may require a metadata update, and the method of FIG. 3 may be used to carry out the metadata update.

Thus, at block 310, a server 110 may receive the request for a file to be created in CFS 150. Following in block 320, in response to receiving the request, CFS 150 both creates the file and additionally allocates a predetermined amount of space (e.g., of a storage device 140) to the file. The CFS 150 of the server 110 may send a response message back to the client, including information identifying the allocated space. It is noted that the specific amount of space (e.g., the number of file data spaces 165) allocated to the file in response to the request may be a fixed size. In other embodiments, the amount of space allocated in block 320 may be programmable and/or set to a desired amount by, for example, a user or software program. An application programming interface (API) may be provided for this purpose.

If a predetermined amount of time has not transpired (block 323), the software program may issue a write command to store data to the file, as shown in block 330. If adequate space is contained in the file to accommodate the write, the client may perform the write. It is noted that client 120 may use its local metadata status for this determination. If additional space needs to be allocated, the CFS 150 of the client 120 may send a request to server 110 to cause CFS 150 to allocate additional space to the file in block 345.

On the other hand, if the predetermined amount of time has transpired prior to receipt of a write command (as determined in block 323), the space allocated to the file is de-allocated by CFS 150 (block 327). It is noted that the predetermined amount of time as determined in block 323 may be a fixed amount of time. In other embodiments, the predetermined amount of time may be programmable and/or set to a desired amount of time by, for example, a user or software program. CFS 150 may include an application programming interface (API) that may allow a software program to set the predetermined amount of time for an individual file. Further, the API may allow a software program to communicate to CFS 150 that the space allocated in block 320 should be de-allocated by CFS 150 prior to expiration of the predetermined amount of time, if needed.

In accordance with the cluster file system operations as illustrated in FIG. 4 and described above, since space may be allocated to a file at the same time the file is created, updates to metadata 180 corresponding to both the creation of the file and the allocation of the space to the file may involve only a single transaction (as described above in conjunction with FIG. 3). When the client performs a subsequent write to the file, an additional update to the metadata (and the corresponding operations of FIG. 3) may be avoided. Accordingly, latency associated with space allocation may be reduced, as well as messaging traffic between the clients and server. Additionally, CPU consumption within, for example, the server may be reduced, thus resulting in overall improved performance.

It is further noted that the method for creating a file and preallocating space in a storage to the file as described above in conjunction with FIG. 4 may be implemented within other file systems of a client-server environment. In addition, it is noted that the method may be applied to other types of files. For example, the method may preallocate space when creating files such as directories, named pipes, "device special files," and/or local socket, as well.

Figure 5A:
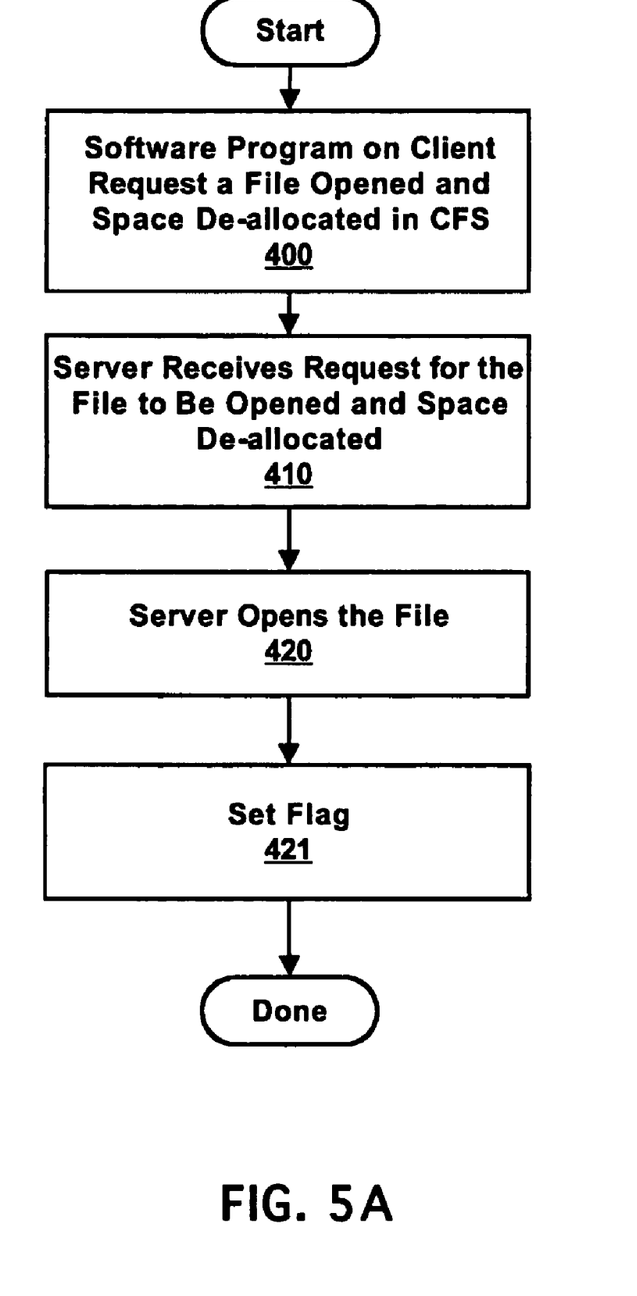
FIG. 5A is a flowchart diagram illustrating a method of opening a file and preserving space allocated to the file in a cluster file system according to one embodiment.
Figure 5B:
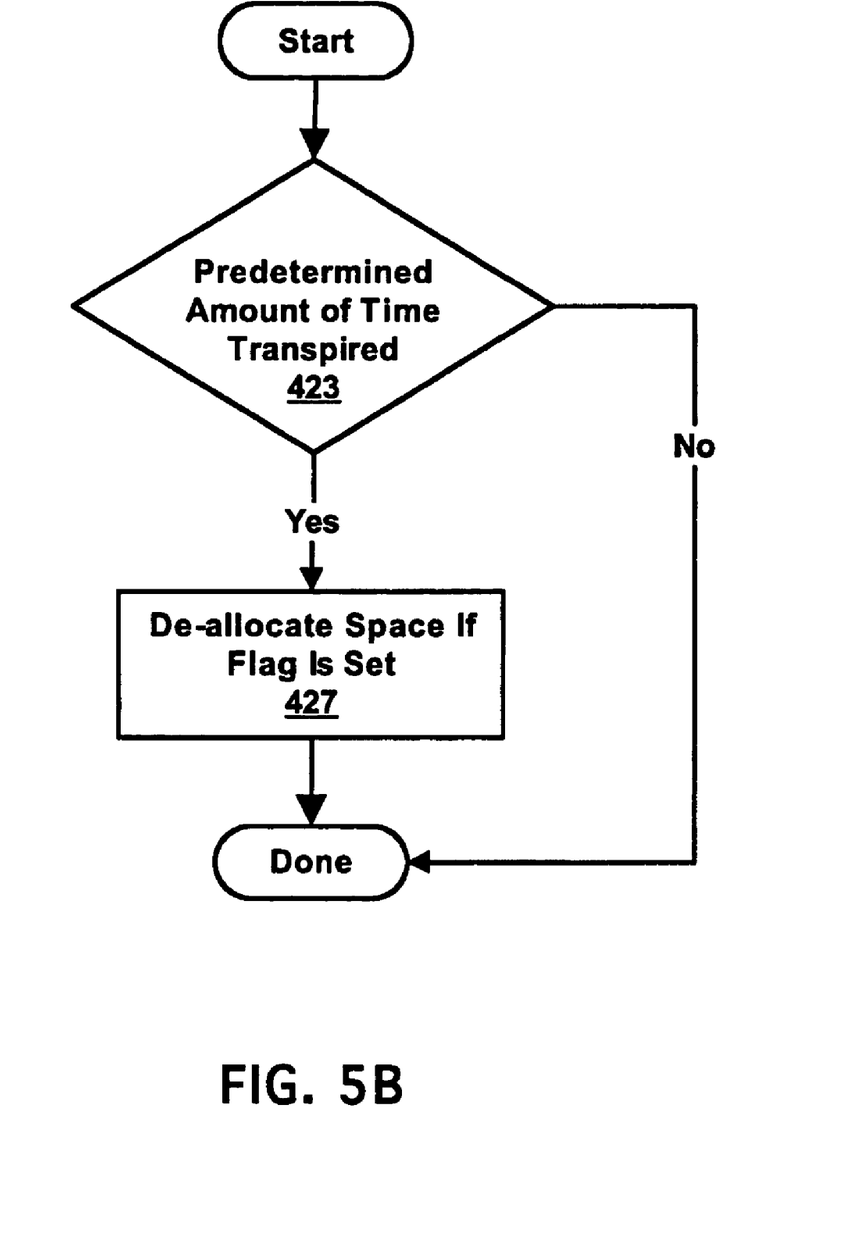
FIG. 5B is a flowchart diagram illustrating a method of determining a predetermined amount of time transpiring and de-allocating space.
Figure 5C:
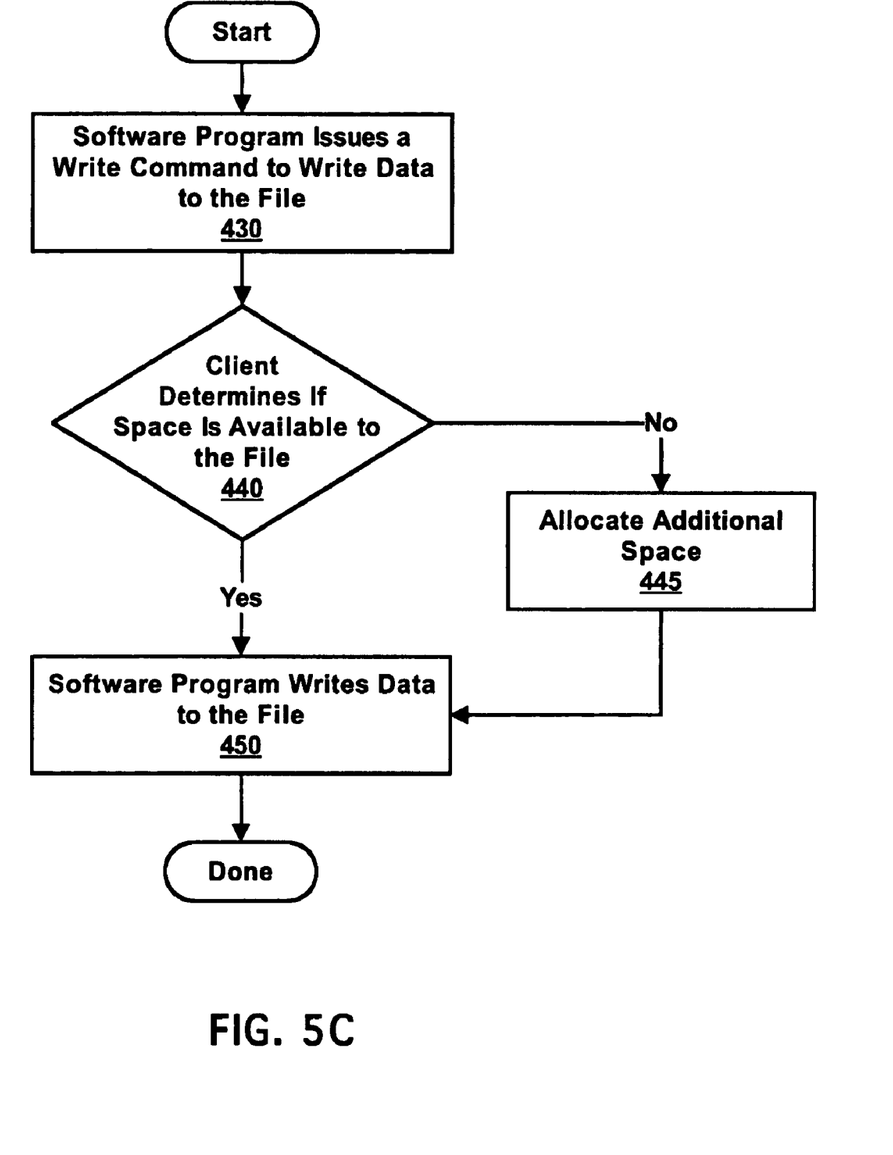
FIG. 5C is a flowchart diagram illustrating a method of storing data in a file.

FIG. 5—Delayed De-Allocation

FIG. 5A is a flowchart diagram illustrating a method for opening a file in a further embodiment of cluster file system 150. A software program executing on a client 120 may issue a request to open a file and to de-allocate (or truncate) space from the file, as shown in block 400. In some implementations, the request may include an explicit truncate command. As discussed above, de-allocating space from a file may require a metadata update.

Next at block 410, a server 110 receives the request in block 420, and the server 110 opens the file in CFS 150. CFS 150 does not, however, immediately de-allocate the space from the file. For example, the file may be a file 195a that includes file data spaces 165a, 165c, and 165d, as illustrated in FIG. 2. Rather than de-allocating the file data spaces, which would require a metadata update (e.g., and the associated update operations depicted in FIG. 3), CFS 150 preserves the space already allocated to the file.

Following at block 421, a flag (which may form a portion of metadata 180) associated with the file may be set. The flag may indicate that file space is allocated to the file but beyond the file size. CFS 150 may include additional functionality to periodically check such flags and reclaim space associated with the file if the file is not written to for a given period of time. In this manner, unnecessary allocation of space to a given file may be avoided.

As illustrated in FIG. 5B, following the operations of FIG. 5A for a given file, a predetermined amount of time transpires without receipt of a write request to the file, as determined in block 423, CFS 150 de-allocates the space of the file in block 427. It is noted that the predetermined amount of time as determined in block 423 may be a fixed amount of time. In other embodiments, the predetermined amount of time may be programmable and/or set to a desired amount of time by, for example, a user or software program. CFS 150 may include an application programming interface (API) that may allow a software program to set the predetermined amount of time for an individual file. It is also noted that in one embodiment, the operations of FIG. 5B may be performed only for files in which a flag (from block 421) is set. Following the truncation operation of block 427, the associated flag may be cleared.

When a write command is received, the functionality of FIG. 5C may be performed. As shown in block 430, the software program may issue the write request to store data to the file. Subsequently, the CFS 150 functionality in the client 120 may determine if space is available to the file to accommodate the write, as shown in block 440. The client may use its local metadata status for this determination. Since the space that was previously allocated to the file was preserved, the method may proceed to block 450, in which the software program may write the data to the file. Thus, in this instance, since the space preserved in the file is sufficient to accommodate the write, the overhead of truncation during the initial open operation is avoided, as well as the need to allocate the space in response to the write request. It is noted that if the space preserved within the file is not sufficient to accommodate the write (as determined in block 440), additional space may be allocated to the file in block 445. Following the allocation operation the flag (from block 421) associated with the file may be cleared.

In various other embodiments, the delayed de-allocation functionality as depicted in FIGS. 5A-5C may be performed in response to a truncation request (rather than in response to an open request). For example, a software program may explicitly issue a request for space of a file to be truncated. The truncation request may include information requesting CFS 150 to de-allocate a portion of the space allocated to the file or to de-allocate all the space allocated to the file. The method illustrated in FIGS. 5A-5C may be used to delay de-allocation in response to such truncation requests.

It is also noted that the functionality as depicted in FIGS. 5A-5B may be performed selectively on a file-by-file basis. CFS 150 may include an API for this purpose. For example, in one embodiment, the API may be used to allow a software program to set information (which may form a portion of metadata 180) such as a flag for each associated file to selectively cause the functionality of FIGS. 5A-5B to be performed.

In addition, in other embodiments, functionality similar to that of FIGS. 5A-5C may be performed by a file system that is not specifically a cluster file system. For example, the functionality of FIGS. 5A-5C may be performed by a file system in other client-server environments. Likewise, in other embodiments, a method for opening a file and preserving space to the file in a manner similar to that described may be employed within a local file system of a single computer system.

Memory Medium and Carrier Medium

One or more of the systems described above, such as client 120, server 110, common storage interconnect 130, and storage 140 may include a memory medium on which operating systems, software programs, file systems, or data may be stored. For example, each of the clients 120 and/or the servers 110 may store a data structure as described above comprising information regarding metadata or data of a part of the cluster file system 150. Each of the clients 120 and/or the servers 110 may further store computer executable instructions for implementing CFS 150.

The term "memory medium" is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer system in which the programs are executed, or may be located in a second different computer system which connects to the first computer over a network. In the latter instance, the second computer system provides the program instructions to the first computer system for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the computer systems described above may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system for delaying a truncation of storage space pre-allocated to a file system object in a cluster file system, the system comprising:
   a CPU; and
   a memory coupled to the CPU, wherein the memory stores program instructions which are executable by the CPU to:
   receive a command to truncate the storage space pre-allocated to the file system object, wherein the space has been allocated to the file system object prior to said receiving, wherein the command to truncate the space allocated to the file system object includes information instructing the cluster file system to de-allocate the space in a de-allocation operation, wherein the cluster file system is configured to conditionally perform:
      in the event a request to store data in the file system object is received prior to a predetermined amount of time transpiring, storing said data in the space allocated to the file system object and aborting the de-allocation operation; or
      in the event said request is not received prior to a predetermined amount of time transpiring, de-allocating said space by performing the de-allocation operation.

2. The system of claim 1, further including program instructions which are executable by the CPU to:
   predetermine the amount of time.

3. The system of claim 1, wherein the file system object is a file.

4. The system of claim 1, wherein the file system object is a directory.

5. The system of claim 1, wherein the file system object is a named pipe.

6. A memory medium comprising program instructions for delaying a truncation of storage space pre-allocated to a file system object in a cluster file system, wherein the program instructions are computer-executable to:
   receive a command to truncate the storage space pre-allocated to the file system object, wherein the space has been allocated to the file system object prior to said receiving, wherein the command to truncate the space allocated to the file system object includes information instructing the cluster file system to de-allocate the space in a de-allocation operation, wherein the cluster file system is configured to conditionally perform:
      in the event a request to store data in the file system object is received prior to a predetermined amount of time transpiring, storing said data in the space allocated to the file system object and aborting the de-allocation operation; or
      in the event said request is not received prior to a predetermined amount of time transpiring, de-allocating said space by performing the de-allocation operation.

7. The memory medium of claim 6, further including program instructions which are executable by the CPU to:
   predetermine the amount of time.

8. The memory medium of claim 6, wherein the file system object is a file.

9. The memory medium of claim 6, wherein the file system object is a directory.

10. The memory medium of claim 6, wherein the file system object is a named pipe.

11. A computer system for delaying a truncation of storage space pre-allocated to a file system object, comprising:
    a computer; and
    a cluster file system including program instructions executable to:
    receive a command to truncate the storage space pre-allocated to the file system object, wherein the space has been allocated to the file system object prior to said receiving, wherein the command to truncate the space allocated to the file system object includes information instructing the cluster file system to de-allocate the space in a de-allocation operation, wherein the cluster file system is configured to conditionally perform:
       in the event a request to store data in the file system object is received prior to a predetermined amount of time transpiring, storing said data in the space allocated to the file system object and aborting the de-allocation operation; or
       in the event said request is not received prior to a predetermined amount of time transpiring, de-allocating said space by performing the de-allocation operation.

12. The system of claim 11, further including program instructions executable to:
    predetermine the amount of time.

13. The system of claim 11, wherein the file system object is a file.

14. The system of claim 11, wherein the file system object is a directory.

15. The system of claim 11, wherein the file system object is a named pipe.

16. A method for delaying a truncation of storage space pre-allocated to a file system object in a cluster file system, comprising:
    receiving a request message from a client, wherein the request message includes information to create the file system object;
    creating the file system object in the cluster file system in response to the information; and
    depending on the information for the file system object:
       allocating space in a storage to the file system object in response to the information, wherein said creating the file system object and said allocating space are performed as an atomic transaction;
       sending a response message to the client, wherein the response message includes information indicative of the space in the storage; and
       de-allocating the space in response to an amount of time transpiring after said allocating without receiving a write command to write to the file system object.

17. The method of claim 16, further comprising setting a predetermined amount of space to be allocated in response to the information.

18. The method of claim 16, wherein the file system object is a file.

19. The method of claim 16, wherein the file system object is a directory.

20. The method of claim 16, wherein the file system object is a named pipe.

21. A method for delaying a truncation of storage space pre-allocated to a file system object in a cluster file system, comprising:

the cluster file system receiving a command to access the file system object, wherein the storage space has been pre-allocated to the file system object prior to said receiving, wherein the command to open the file system object includes information instructing the cluster file system to de-allocate the space in a de-allocation operation, wherein the cluster file system is configured, depending on the information for the file system object, to conditionally perform:

in the event a request to store data in the file system object is received, storing said data in the space allocated to the file system object and aborting the de-allocation operation; or in the event said request is not received prior to a predetermined amount of time transpiring, de-allocating said space by performing the de-allocation operation.

22. The method of claim 21, further comprising setting the predetermined amount of time.

23. The method of claim 21, wherein the file system object is a file.

24. The method of claim 21, wherein the file system object is a directory.

25. The method of claim 21, wherein the file system object is a named pipe.

* * * * *